(12) United States Patent
Wu et al.

(10) Patent No.: US 12,460,087 B2
(45) Date of Patent: Nov. 4, 2025

(54) ULTRAVIOLET CURING COATING COMPOSITION AND USE THEREOF

(71) Applicant: Phichem Corporation, Shanghai (CN)

(72) Inventors: Yan Wu, Shanghai (CN); Jianbin Yu, Shanghai (CN)

(73) Assignee: Phichem Corporation, Shanghai (CN)

( * ) Notice: Subject to any disclaimer, the term of this patent is extended or adjusted under 35 U.S.C. 154(b) by 17 days.

(21) Appl. No.: 18/027,445

(22) PCT Filed: Sep. 22, 2021

(86) PCT No.: PCT/CN2021/119669
§ 371 (c)(1),
(2) Date: Mar. 21, 2023

(87) PCT Pub. No.: WO2022/063135
PCT Pub. Date: Mar. 31, 2022

(65) Prior Publication Data
US 2023/0331992 A1  Oct. 19, 2023

(30) Foreign Application Priority Data

Sep. 23, 2020 (CN) .......................... 202011010489.2

(51) Int. Cl.
*C09D 4/06* (2006.01)
*C09D 7/43* (2018.01)
*C09D 7/63* (2018.01)

(52) U.S. Cl.
CPC ............... *C09D 4/06* (2013.01); *C09D 7/43* (2018.01); *C09D 7/63* (2018.01)

(58) Field of Classification Search
None
See application file for complete search history.

(56) References Cited

U.S. PATENT DOCUMENTS

| | | |
|---|---|---|
| 5,134,175 A | 7/1992 | Lucey |
| 5,199,098 A | 3/1993 | Nolan et al. |
| 2002/0102086 A1* | 8/2002 | Fewkes .................. C03C 25/106 385/128 |
| 2003/0169989 A1 | 9/2003 | Abel et al. |
| 2019/0187366 A1* | 6/2019 | Enomoto ........... G02B 6/02395 |
| 2020/0255333 A1* | 8/2020 | Cao ...................... C03C 25/1065 |
| 2020/0400881 A1* | 12/2020 | Meijer .................. C03C 25/104 |

FOREIGN PATENT DOCUMENTS

| | | |
|---|---|---|
| CN | 1028784 C | 6/1995 |
| CN | 1850936 A | 10/2006 |
| CN | 102336861 A | 2/2012 |
| CN | 104263063 A | 1/2015 |
| CN | 107245122 A | 10/2017 |
| CN | 110764207 A | 2/2020 |
| CN | 111315701 A | 6/2020 |
| JP | H-115944 A | 1/1999 |
| KR | 2002-0067061 A | 8/2002 |
| WO | WO 84/00424 A1 | 2/1984 |
| WO | WO 03/023101 A1 | 3/2003 |
| WO | 2014/088926 A1 | 6/2014 |
| WO | 2019/203639 A1 | 10/2019 |

OTHER PUBLICATIONS

Green. W A' "Boosting the cure of phosphine oxide photoinitiators", Sensitisation or Synergy?[C]//RadTech International UV & EB Technology Expo & Conference (RADTECH 2016): Chicago, Illinois, USA, May 15-18, 2016.
Anyang General Chem Co., Ltd., "Photoinitiator Overview", www.sellchems.com/photoinitiator-introduction, 2017.
Extended European Search Report for counterpart foreign application, Mar. 22, 2024.
Communication pursuant to Rule 114(2) EPC for counterpart foreign application, Nov. 10, 2023.
Communication pursuant to Rule 114(2) EPC for counterpart foreign application Apr. 5, 2023.

* cited by examiner

*Primary Examiner* — Shamim Ahmed
*Assistant Examiner* — Bradford M Gates
(74) *Attorney, Agent, or Firm* — Hoffmann & Baron, LLP

(57) ABSTRACT

An ultraviolet curing coating composition includes unsaturated carboxylic acid and salts thereof, a compound containing a carbonyl group, a thickener, a photoinitiator, and deionized water. The added value of a fiber attenuation coefficient of the composition is less than 0.02 dB/km. A coating internally cross-linked in a network shape is formed on the surface of an optical fiber by interaction between active groups, and the coating has a faster water absorption rate and better water blocking effect and is not easy to water loss. Under the optimal mixing of raw materials, the water absorption rate of the coating composition is maintained at 3 to 15 times and further can be controlled at 3 to 10 times, so that a water-soluble tensile coating coated on the optical fiber will not excessively squeeze the optical fiber after absorbing water to cause the attenuation of the optical fiber over the standard.

10 Claims, No Drawings

ULTRAVIOLET CURING COATING COMPOSITION AND USE THEREOF

CROSS-REFERENCE TO RELATED APPLICATIONS

This application is the National Stage of International Application No. PCT/CN2021/119669, filed Sep. 22, 2021, which claims the benefit of Chinese Application No. 202011010489.2, filed Sep. 23, 2020, the contents of which is incorporated by reference herein.

TECHNICAL FIELD

The present application relates to the technical field of ultraviolet curing coating, particularly to an ultraviolet curing coating composition and use thereof.

BACKGROUND

It is well-known that water vapor is very harmful to optical cables, the intrusion of the external moisture and dampness may cause increased hydrogen loss in the optical cable, and the strength of the optical fiber is damaged, which in turn affects the service life and transmission performance of optical fiber. According to the different water blocking ways, water blocking optical cable can be divided into filled optical cable, semi-dry optical cable and full dry optical cable, wherein filled and semi-dry optical cable are mainly use the way of filling ointment in the fiber loose sheath to achieve the effect of water blocking, but the ointment is often difficult to be wiped clean in the construction process, and pollutes the environment at the same time, which brings some inconvenience to the cable construction and also adds weight to the cable. Since all dry optical cable does not use ointment filling in the production process, it not only avoids many troubles in the construction process, but also conforms to the concept of green environmental protection. Therefore, all dry optical cable will be a major trend in the development of optical cable in the future. Water blocking materials such as water blocking powder, water blocking yarn or hot melt adhesive water blocking ring are mostly used in the existing dry optical cable sheath to achieve the radial water blocking effect of the sheath through the good water absorption and expansion performance thereof. Water blocking powder and water blocking yarn are easy to absorb moisture, have strict preservation environment requirements, are easy to appear phenomenon of powder dropping (If the phenomenon is serious, it may lead to accidents in optical cable production), and have high process requirements. The water blocking method of filling the hot melt adhesive water blocking ring between the inner and outer sheath of the optical cable is inefficient, cumbersome and has poor water blocking effect. In the design and manufacture of the existing dry type optical cable, the water blocking materials such as water blocking ointment, water blocking powder, water blocking yarn, water blocking tape and the like are basically filled or wrapped, although they may play a certain degree of water blocking effect, but most of them have complex manufacturing process and the materials themselves are thick, which also leads to the excessive weight of optical cables.

CN107245122A, CN1208784C and other Chinese patents have disclosed the relevant technologies of water blocking tape and water blocking yarn. Although the water blocking effects of these materials are good, there are problems such as thicker product shape, large section diameter of optical cable, complex manufacturing process and the like. At present, the coating compositions that can be directly applied on the surface of optical fiber in a controlled way, can cured into a uniform coating by radiation and have water blocking performance are rarely recorded in the literature. Among them, foreign patent WO2019203639A1 relates to a water-blocking and radiation curable coating composition for optical fiber, the coating has a quite large water absorption magnification, which will cause the squeezing of the optical fiber and serious attenuation of the optical fiber. In addition, most of the existing coatings used for water blocking of optical fiber pursue higher water absorption magnification, resulting in serious attenuation of optical fiber, and serious obstruction of signal transmission, and optical fiber with excessive attenuation is also difficult to be accepted by the market. Further, the existing optical fiber water blocking coating will have poor water blocking performance due to uneven curing during the curing process. Specifically, this will lead to a slow water absorption rate and an unsatisfactory water blocking effect in the stricter environment such as in a lower water content. In addition, the stability of the coating will also affect the storage performance, coating property, water blocking property and the like of the coating.

SUMMARY OF THE INVENTION

In order to solve the above problems, a first aspect of the present application provides an ultraviolet curing coating composition, the composition comprises the following components: unsaturated carboxylic acid and its salts, carbonyl-containing compound, thickener, photoinitiator, and deionized water; the increase in fiber attenuation coefficient of the composition is less than 0.02 dB/km.

As a preferred technical scheme, the unsaturated carboxylate are selected from at least one of unsaturated sodium carboxylate, unsaturated potassium carboxylate and unsaturated zinc carboxylate.

As a preferred technical scheme, the carbon atom in carbonyl bonds to an oxygen atom or a nitrogen atom.

As a preferred technical scheme, the thickener is selected from at least one of waterborne polyurethane thickener, hydrophobic modified polyether thickener and hydrophobic modified amino thickener.

As a preferred technical scheme, the photoinitiator is selected from at least one of acylphosphine oxide-type photoinitiator, alkyl phenone-type photoinitiator, benzophenone-type photoinitiator, benzil-type photoinitiator and thioxanthone-type photoinitiator.

As a preferred technical scheme, the photoinitiator is selected from at least two of acylphosphine oxide-type photoinitiator, alkyl phenone-type photoinitiator, benzophenone-type photoinitiator, benzil-type photoinitiator and thioxanthone-type photoinitiator.

As a preferred technical scheme, the photoinitiator is selected from at least three of acylphosphine oxide-type photoinitiator, alkyl phenone-type photoinitiator, benzophenone-type photoinitiator, benzil-type photoinitiator and thioxanthone-type photoinitiator.

When the photoinitiator is selected from a group consisting of at least two photoinitiators, as a preferred technical scheme, the photoinitiator comprises at least one of alkyl phenone-type photoinitiator, benzophenone-type photoinitiator, benzil-type photoinitiator and thioxanthone-type photoinitiator.

When the photoinitiator is selected from a group consisting of at least two photoinitiators, as a preferred technical scheme, the alkyl phenone-type photoinitiator comprises less than 70 wt. % of the photoinitiator.

As a preferred technical scheme, the composition comprises the following components: 20-70 wt. % of unsaturated carboxylic acid and its salts, 0.02-10 wt. % of carbonyl-containing compound, 1-20 wt. % of thickener, 0.01-5 wt. % of photoinitiator, and the remainder is deionized water.

A second aspect of the present application provides use of the ultraviolet curing coating composition as described above in dry optical cable.

Beneficial effects: the present application provides an ultraviolet curing coating composition, through the interaction between active groups, a network-like internally cross-linked coating is formed on the surface of the optical fiber. The water absorption rate thereof is faster, and water may be rapidly absorbed under extreme conditions with a lower water content. The water blocking effect thereof is better, and water is not easy to lose. Under the preferred mixing of raw materials, the water absorption magnification of the coating composition is kept at 3-15 times, and can be further controlled at 3-10 times, such that the water swelling coating applied on the optical fiber will not over-squeeze the optical fiber after water absorption, causing the optical fiber attenuation to exceed the standard. Compared with all kinds of optical fiber water blocking materials used in existing dry-type optical cables, the thickness of the water blocking coating in the present application is greatly reduced, and may be below 10 μm or even below 6 The preferred thickness may be 4 μm, it may significantly reduce the weight of the optical cable, so that under the same weight, the increase of the number of cores of the wire can increase the communication weight. The coating composition can be directly applied and cured with existing ink coloring equipment which has the advantages of simple process, fast curing speed and high production efficiency. The coating composition of the present application still remains in an elastic film state after water absorption and expansion, and will not fall; and the product has good stability, high uniformity and is suitable for long-term storage.

DETAILED DESCRIPTION OF THE EMBODIMENTS

The content of the present application may be further understood by referring to the following detailed descriptions of preferred implementation methods of the present application and included embodiments. Unless otherwise defined, all technical and scientific terms used herein have the same meaning as commonly understood by those of ordinary skill in the art to which the present application belongs. If the definitions of specific terms disclosed in the prior art are inconsistent with any definitions provided in the present application, the definitions of terms provided in the present application are used as standards.

As used herein, unless the context clearly indicates otherwise, the features without limiting the singular and plural forms are also intended to include the features of the plural forms. It should also be understood that, the terms "prepared from" and "include" are synonymous, "comprise", "containing", "having", "including" and/or "including with" as used herein, when used in this specification, mean the composition, step, method, product or device described, but do not exclude the existence or addition of one or more other compositions, steps, methods, products or devices. In addition, when describing the embodiments of the present application, the use of "preferred", "preferably", "more preferred" and the like means the embodiments of the present application which can provide some beneficial effects under certain circumstances. However, in the same or other cases, other embodiments may also be preferred. In addition, the expression of one or more preferred embodiments does not imply that other embodiments are not available, nor is it intended to exclude other embodiments from the scope of the present application.

In order to solve the above problems, a first aspect of the present application provides an ultraviolet curing coating composition, the ultraviolet curing coating composition comprises the following components: unsaturated carboxylic acid and its salts, carbonyl-containing compound, thickener, photoinitiator, and deionized water; the increase in fiber attenuation coefficient of the composition is less than 0.02 dB/km.

The unsaturated carboxylic acid and its salts of the present application have both the unsaturated group and carboxyl, thus having good solubility in water, and can also be polymerized, coated and UV cured to form a water-blocking coating attached to the optical fiber. In some preferred embodiments, the unsaturated carboxylic acid is acrylic acid.

In some preferred embodiments, the unsaturated carboxylate is selected from at least one of unsaturated sodium carboxylate, unsaturated potassium carboxylate and unsaturated zinc carboxylate; further preferably, the unsaturated carboxylate is unsaturated sodium carboxylate; still further preferably, the unsaturated carboxylate is sodium acrylate.

The acrylic acid and sodium acrylate in the present application are commercially available, and the inorganic base can also be used to neutralize the acrylic acid group into its salt. The inorganic bases known to those skilled in the art are suitable for this purpose.

From the perspective of simplifying the process, in some embodiments, the sodium acrylate is obtained by neutralizing acrylic acid with sodium hydroxide in accordance with a certain neutralization degree.

The term "neutralization degree" used herein refers to the molar ratio of acrylic acid and sodium hydroxide, which is also equal to the molar ratio of acrylic acid and sodium acrylate. In some preferred embodiments, the molar ratio of acrylic acid and sodium acrylate is (1:9) to (9:1). As an example, the molar ratio of acrylic acid and sodium acrylate may be 1:9, 1:4, 3:7, 2:3, 1:1, 3:2, 7:3, 4:1, 9:1, etc. In the study, the inventor found that if the neutralization degree is too low, the sodium acrylate content is relatively low, and the water absorption magnification is too low to meet the water blocking requirement. If the neutralization degree is too high, the sodium acrylate content is relatively high, the cross-linking degree will be low, the curing rate will be reduced, and the water absorption expansion magnification will be too high and the optical fiber is squeezed, the light within the optical fiber will be lost due to scattering, resulting in loss, and the bending of the optical fiber will also affect the signal transmission.

From the perspective of balancing the water blocking performance and curing rate of the coating, in some preferred embodiments, the carbon atom in the carbonyl group bonds with an oxygen atom or a nitrogen atom; further preferably, the carbonyl-containing compound also contains carbon-carbon double bond. The inventor found that the introduction of double bond in the carbonyl-containing compound allows it to polymerize with unsaturated carboxylic acid, and the carbon atom in the carbonyl group bonds with an oxygen atom or a nitrogen atom, which increases the molecular polarity. Under the effect of polarity, a network-like cross-linked structure is formed in the system, which improves the various properties of the coating.

In some preferred embodiments, the carbonyl-containing compound is used as a cross-linking agent to allow the cross-linking and curing of the coating composition so as to form a network-like coating.

In some preferred embodiments, the carbonyl-containing compound is used as a co-monomer to improve the mechanical properties, heat resistance and corrosion resistance of the coating composition.

In some preferred embodiments, the carbonyl-containing compound is present in the coating composition as a cross-linking agent and a co-monomer simultaneously.

When the carbonyl-containing compound is used as a cross-linking agent, in some preferred embodiments, the carbonyl-containing compound is selected from a mixture of one or more of diacetone acrylamide, N-p-hydroxyphenyl acrylamide, N,N-dibenzyl acrylamide, N,N-methylenebisacrylamide, N,N-ethylenebisacrylamide, N-hydroxymethylacrylamide, N-hydroxyethyl acrylamide, ethylene glycol diacrylate, diethylene glycol diacrylate, triethylene glycol diacrylate, tetraethylene glycol diacrylate, ethoxylated hexanediol diacrylate, ethoxylated trimethylolpropane triacrylate, trimethylolpropane diacrylate, trimethylolpropane triacrylate, methyl ether diacrylate, neopentyl glycol diacrylate, 1,3-butanediol diacrylate, glycerol-1,3-diglycerolate diacrylate, 1,6-hexanediylbis[oxy-2-hydroxy-3,1-propanediyl] bisacrylate, pentaerythritol triacrylate, ethoxylated pentaerythritol triacrylate, 1,4-butanediol diacrylate, 1,6-hexanediol diacrylate, polyethylene glycol diacrylate, propylene glycol diacrylate, hexamethylene glycol diacrylate, bisphenol A diacrylate, pentaerythritol tetraacrylate; in the study, the inventor found that the solubility problem of the cross-linking agent in the product system led to the appearance of particles in the coating composition. After the coating is applied on the surface of the optical fiber, the uneven surface of the optical fiber would cause an increase in attenuation. From the perspective of obtaining a coating composition with low optical fiber attenuation based on the stability of the coating composition in the water system and the good compatibility of the coating composition, in some preferred embodiments, the carbonyl-containing compound is selected from a mixture of one or more of ethylene glycol diacrylate, N,N-ethylenebisacrylamide, N,N-methylenebisacrylamide, N-hydroxyethyl acrylamide, N-hydroxymethylacrylamide, propylene glycol diacrylate, 1,3-butanediol diacrylate and diethylene glycol diacrylate. In some preferred embodiments, the proportion of the cross-linking agent in the coating composition is 0.02~5 wt. %. An excessively high content of cross-linking agent will lead to poor compatibility of the system and the presence of insoluble particles will cause the attenuation of optical fiber to become larger; and an excessively low content will have no cross-linking effect, and the water absorption magnification and water absorption rate will not meet the standards. As an example, the weight percentage of the cross-linking agent in the coating composition may be 0.02%, 0.05%, 0.08%, 0.1%, 0.2%, 0.3%, 0.4%, 0.5%, 0.6%, 0.7%, 0.8%, 0.9%, 1%, 1.2%, 1.4%, 1.6%, 1.8%, 2%, 2.2%, 2.4%, 2.6%, 2.8%, 3%, 3.2%, 3.4%, 3.6%, 3.8%, 4%, 4.2%, 4.4%, 4.6%, 4.8%, 5%, and the like; and further preferably, the proportion of the cross-linking agent in the coating composition is 0.1-3 wt. %.

When the carbonyl-containing compound is used as a co-monomer, the carbonyl-containing compound may be selected from the following compounds: a mixture of one or more of hydroxyethyl acrylate, methoxy (polyethylene glycol) acrylate, ethoxy (polyethylene glycol) acrylate, 2-(2-ethoxyethoxy) ethyl acrylate, ethylene glycol methyl ether acrylate, diethylene glycol methyl ether acrylate, triethylene glycol methyl ether acrylate, tetramethylene glycol methyl ether acrylate, ethylene glycol ethyl ether acrylate, diethylene glycol ethyl ether acrylate, triethylene glycol ethyl ether acrylate, tetramethylene glycol ethyl ether acrylate, and diethylene glycol 2-ethylhexyl acrylate. From the perspective of improving the mechanical properties, acid resistance, alkali resistance, corrosion resistance and heat resistance of the coating composition, in some preferred embodiments, the carbonyl-containing compound is selected from a mixture of one or more of hydroxyethyl acrylate, methoxy (polyethylene glycol) acrylate, ethylene glycol methyl ether acrylate, triethylene glycol methyl ether acrylate, and ethoxy (polyethylene glycol) acrylate. However, the inventor found in careful study that the added amount of co-monomer needs to be strictly controlled, and when the added amount is excessive it will lead to significant reduction in the water absorption rate and expansion magnification of the coating. In order not to affect the water absorption rate and expansion magnification of the coating after it being cured, the added amount of the co-monomer (weight percentage) shall not exceed 5%, preferably no more than 1%, and the optional proportion of co-monomer is 0.01 wt. %, 0.05 wt. %, 0.1 wt. %, 0.5 wt. %, 0.6 wt. %, and 0.8 wt. %. In some preferred embodiments, it is more preferable not to add co-monomer.

In some preferred embodiments, the thickener is selected from at least one of waterborne polyurethane thickener, hydrophobic modified polyether thickener and hydrophobic modified amino thickener.

The term "waterborne polyurethane thickener" (HEUR) used herein is a kind of ethoxypolyurethane water-soluble polymer modified by hydrophobic group, which is consisted of hydrophobic group, hydrophilic chain and polyurethane group; the term "hydrophobic modified amino thickener" (HEAT) is a multi-branched hydrophobic structure compound made by connecting a plurality of hydrophobic groups on an amino resin containing a polyoxyethylene chain.

In some preferred embodiments, the waterborne polyurethane thickener (HEUR) is selected from at least one of BYK425, TEGO ViscoPlus 3010, TEGO ViscoPlus 3030, and TEGO ViscoPlus 3060.

In some preferred embodiments, the hydrophobic modified amino thickener (HEAT) is Optiflo H500.

In some preferred embodiments, the hydrophobic modified polyether thickener is selected from at least one of Aquaflow NLS 200, Aquaflow NLS210, and Aquaflow NHS300.

Taking the properties of good stability, easy storage, good compatibility, non-toxic and tasteless of the coating composition as a starting point, in some preferred embodiments, the photoinitiator is selected from at least one of acylphosphine oxide-type photoinitiator, alkyl phenone-type photoinitiator, benzophenone-type photoinitiator, benzil-type photoinitiator and thioxanthone-type photoinitiator; further preferably, the photoinitiator is one type of photoinitiator.

In order to improve the water absorption rate of the coating composition, in some other preferred embodiments, the photoinitiator is selected from at least two of acylphosphine oxide-type photoinitiator, alkyl phenone-type photoinitiator, benzophenone-type photoinitiator, benzil-type photoinitiator and thioxanthone-type photoinitiator; further preferably, the photoinitiator includes two types of photoinitiators.

In other preferred embodiments, the photoinitiator is selected from at least three of acylphosphine oxide-type photoinitiator, alkyl phenone-type photoinitiator, benzophenone-type photoinitiator, benzil-type photoinitiator and thioxanthone-type photoinitiator; preferably, the photoinitiator includes three types of photoinitiators.

The acylphosphine oxide-type photoinitiator may be bisacylphosphine oxide (BAPO) or monoacylphosphine oxide (MAPO); the bisacylphosphine oxide-type photoinitiator may be, for example, phenyl bis(2,4,6-trimethylbenzoyl) phosphine oxide (819), bis(2,4,6-trimethylbenzoyl)-(2,4-dipentyloxyphenyl) phosphine oxide, bis(2,6-dimethoxybenzoyl)-2,4,4-trimethylpentylphosphine oxide, and the like; the monoacylphosphine oxide-type photoinitiator may be, for example, 2,4,6-trimethylbenzoyl diphenyl phosphine oxide (TPO), 2,4,6-trimethylbenzoyl ethoxyphenyl phosphine oxide (TEPO), and the like.

The alkyl phenone-type photoinitiator may be, for example, 1-hydroxycyclohexyl phenyl ketone (184), 2-hydroxy-2-methyl-1-phenyl-1-propanone (1173), 2-methyl-1-[4-(methylthio)phenyl]-2-(4-morpholinyl)-1-propanone (907), 2-hydroxy-2-methyl-1-[4-(2-hydroxyethoxy)phenyl]-1-propanone (2959), 1,1'-(methylene-di-4,1-phenylene) bis[2-hydroxy-2-methyl-1-propanone] (127), 2-benzyl-2-dimethylamino-1-(4-morpholinophenyl)butanone (369), 2-(4-methylbenzyl-2-(dimethylamino)-1-[4-(4-morpholinyl)phenyl]-1-butanone, 2-benzyl-2-(dimethylamino)-[3,4-dimethoxyphenyl]-1-butanone, and the like.

The benzophenone-type photoinitiator may be, for example, benzophenone (BP), 2,4,6-trimethylbenzophenone, 4-methylbenzophenone, 2-methylbenzophenone, 2-methoxycarbonyl benzophenone, 4,4'-bis(chloromethyl)-benzophenone, 4-chlorobenzophenone, 4-phenylbenzophenone, 4,4'-bis(dimethylamino)-benzophenone, 4,4'-bis(diethylamino)-benzophenone, methyl-2-benzoyl benzoate, 3,3'-dimethyl-4-methoxy benzophenone, 4-(4-methylphenylthio) benzophenone, 2,4,6-trimethyl-4'-phenylbenzophenone, 3-methyl-4'-phenylbenzophenone, and the like.

The benzil-type photoinitiator may be, for example, 2,2-dimethoxy-2-phenylacetophenone (BDK), 2,2-dimethoxy-1,2-diphenyl-ethanone, and the like.

The thioxanthone-type photoinitiator may be, for example, 2-isopropyl thioxanthone (1TX), and the like.

From the perspective of ensuring the curing rate and water absorption rate of the coating, in some preferred embodiments that use a group consisting of at least two types of photoinitiators as the photoinitiator of the present application, the photoinitiator contain at least one of alkyl phenone-type photoinitiator, as well as benzophenone-type photoinitiator, benzil-type photoinitiator, and thioxanthone-type photoinitiator. In some preferred embodiments in which the group consisting of at least two types of photoinitiators is used as the photoinitiator of the present application, the proportion of alkyl phenone-type photoinitiatos in the photoinitiator is less than 70 wt. %. For example, the proportion (weight percentage) of alkyl phenone-type photoinitiator in the photoinitiator may be 30%, 32.5%, 35%, 37.5%, 40%, 42.5%, 45%, 47.5%, 50%, 52.5%, 55%, 57.5%, 60%, 62.5%, 65%, 67.5%, 70%, and the like; further preferably, the proportion of alkyl phenone-type photoinitiator in the photoinitiators is 30-70 wt. %; still further preferably, the proportion of alkyl phenone-type photoinitiator in the photoinitiator is 40-60 wt. %.

The applicant has proved through a large number of experiments that the coating has a faster water absorption rate under the same water absorption magnification when the group consisting of at least two types of photoinitiators is used as the photoinitiator of the present application and the proportion of alkyl phenone-type photoinitiator in the photoinitiator is less than 70 wt. %, compared with the group using only a single type of photoinitiator.

In some preferred embodiments, the composition comprises the following components: 20-70 wt. % of unsaturated carboxylic acid and its salts, 0.02-10 wt. % of carbonyl-containing compound, 1-20 wt. % of thickener, 0.01-5 wt. % of photoinitiator, and the remainder is deionized water; as an example, the proportion (weight percentage) of the unsaturated unsaturated carboxylic acid and its salts in the coating composition may be 20%, 25%, 30%, 35%, 40%, 45%, 50%, 55%, 60%, 65%, 70%, and the like; as an example, the proportion (weight percentage) of carbonyl-containing compounds in the coating composition may be 0.02%, 0.06%, 0.1%, 0.2%, 0.3%, 0.4%, 0.5%, 0.6%, 0.7%, 0.8%, 0.9%, 1%, 1.2%, 1.4%, 1.6%, 1.8%, 2%, 2.2%, 2.4%, 2.6%, 2.8%, 3%, 3.2%, 3.4%, 3.6%, 3.8%, 4%, 4.2%, 4.4%, 4.6%, 4.8%, 5%, 5.2%, 5.4%, 5.6%, 5.8%, 6%, 6.2%, 6.4%, 6.6%, 6.8%, 7%, 7.2%, 7.4%, 7.6%, 7.8%, 8%, 8.2%, 8.4%, 8.6%, 8.8%, 9%, 9.2%, 9.4%, 9.6%, 9.8%, 10%, and the like; as an example, the proportion (weight percentage) of thickener in the coating composition may be 1%, 2%, 3%, 4%, 5%, 6%, 7%, 8%, 9%, 10%, 11%, 12%, 13%, 14%, 15%, 16%, 17%, 18%, 19%, 20%, and the like; as an example, the proportion (weight percentage) of the photoinitiator in the coating composition may be 0.01%, 0.03%, 0.05%, 0.08%, 1%, 1.2%, 1.5%, 1.8%, 2%, 2.2%, 2.5%, 2.8%, 3%, 3.2%, 3.5%, 3.8%, 4%, 4.2%, 4.5%, 4.8%, 5%, and the like.

It is further preferred that the composition comprises the following components: 40-70 wt. % of unsaturated carboxylic acid and its salts, 0.1-4 wt. % of carbonyl-containing compound, 3-10 wt. % of thickener, 0.1-1 wt. % of photoinitiator, and the remainder is deionized water.

When the above components are within the above proportion ranges, each component can cooperate such that the water absorption magnification of the prepared UV coating is controlled at 3-15 times, with fast water absorption rate, low optical fiber attenuation and excellent water blocking effect.

The applicant has found in a large number of practices that water, as a part of the coating composition of the present application, is used to dissolve small molecules of unsaturated carboxylic acid and its salts. The amount of water should not exceed 70 wt. % of the coating composition. When the amount of water is too high, it will affect the water absorption performance of the coating, resulting in an excessively low water absorption magnification. At the same time, the amount of water should not be less than 20 wt. % of the coating composition. An excessively low amount of water will make the raw material unable to completely dissolve, be dispersed in the coating in granular form, and not conducive to use. The coating composition is cured by UV to form a water absorption and water swelling coating. The water absorption rate of the coating is positively related to the water absorption magnification. If the water absorption rate is too low, when there is water intrusion, the water cannot be completely absorbed in a short time, and water will enter into the optical fiber, causing damage to the optical fiber. Therefore, the faster the water absorption rate, the better the water blocking effect. In addition, the market requires that the attenuation coefficient of optical fiber should not exceed 0.200 dB/km. A large attenuation coefficient will cause the signal transmission of the optical fiber to be seriously blocked and difficult to use. The attenuation coefficient of common optical fiber (without water blocking coating) is generally 0.180 dB/km~0.190 dB/km. Therefore, the increase of external forces (such as the coating of water blocking coating) will make that the increase in the attenuation coefficient of optical fiber must be less than 0.02 dB/km, more preferably less than 0.01 dB/km to meet the market requirements for the use of optical fiber. The coating is a water absorbing swelling coating formed by curing liquid coating applied directly on the surface of optical fiber, in which the water absorption magnification is too high and the volume expansion is too large, which will squeeze the surrounding optical fiber and cause attenuation. Example 15 provided in present application further explains that when the water blocking coating is applied on the optical fiber, and the water absorption magnification is 1 to 15 times, the increase in the attenuation coefficient of the optical fiber is less than or equal to 0.02 dB/km, and when the water absorption magnification is more than 15 times, the attenuation coefficient of optical fiber significantly increases. Further, when the water absorption magnification is 1-10 times, the increase in the attenuation coefficient of optical fiber is less than or equal to 0.01 dB/km. The tolerance of the attenuation coefficient of common optical fiber itself is large, and it can be used for common optical fiber with a wide range of optical fiber attenuation. In addition, the applicant found that when the water absorption magnification is 3 times, it can meet the minimum water blocking requirement of the optical fiber water blocking coating, and when the water absorption magnification is too low, the volume expansion is not enough to fill the gap, and the water blocking effect is not good. In order to ensure that the coating composition has a good water blocking effect while not squeezing the optical fiber and causing loss, the water absorption magnification of the optical fiber water blocking coating needs to be controlled within a suitable range, generally controlled at 3-15 times. As an example, the water absorption magnification of the optical fiber water blocking coating may be 3 times, 4 times, 5 times, 6 times, 7 times, 8 times, 9 times, 10 times, 11 times, 12 times, 13 times, 14 times, 15 times, and the like, more preferably, 3 to 10 times is ideal. It should be noted that the water absorption rate is positively correlated with the water absorption magnification, and the water loss rate is positively correlated with the water absorption magnification. Under the condition that the water absorption magnification of the coating composition meets the low optical fiber attenuation, the higher the water absorption magnification, the better the water blocking effect.

Through the control of the amount of thickener, adjustment of the viscosity of the system, it can be ensured that the storage performance and construction performance of the product are improved without reducing the water blocking properties, so that curing occurs at normal temperature without heating. Less than 1 wt. % of the usage amount of the thickener may cause insufficient coating thickness; and on the contrary, if the usage amount is higher than 20 wt. %, the curing time is too long, and the coating is easy to crack. In order to accelerate the curing, heating is also required, and the water will volatilize. When the water volatilizes to a certain proportion, the solubility of unsaturated carboxylate in the system will decrease, and solid particles will be crystallized and precipitated, making the product deteriorated and unusable. The coating composition used for water blocking in present application is directly applied to optical fiber or optical fiber bundle, and the requirements for controlling the viscosity of the coating composition are strict. The viscosity of the coating composition is preferably within a range of 40-1000 cps. As an example, the viscosity of the coating composition may be 40 cps, 80 cps, 100 cps, 150 cps, 200 cps, 250 cps, 300 cps, 350 cps, 400 cps, 450 cps, 500 cps, 550 cps, 600 cps, 650 cps, 700 cps, 750 cps, 800 cps, 850 cps, 900 cps, 950 cps, 1000 cps, and the like. Further, the viscosity of the coating is more preferably in a range of 400~600 cps. The curable coating composition in present application has the best coating and curing effects, and can be used at normal temperature without heating.

The photoinitiator may affect the polymerization degree of acrylic acid-sodium acrylate, and excessive use will adversely affect the water absorption rate and water absorption magnification of the coating. Example 10 provided in present application further explains that the content of photoinitiator is more than 5 wt. %, and the water absorption magnification of the coating composition is too low to meet the water blocking requirement of the optical fiber, and the water absorption rate is too slow, the water is difficult to be quickly absorbed under extreme conditions (such as in a lower water content), and the water blocking effect is not ideal. The inventor found that when the photoinitiator was introduced into the coating composition in the form of a group consisting of at least two types of photoinitiators, the curing rate of the coating was improved, not only the water blocking property, especially the water absorption rate was increased, but also the water retention performance was improved.

From the perspective of optical fiber identification, in some preferred embodiments, the coating composition also includes pigment powder.

In some preferred embodiments, the pigment powder is organic pigment powder or inorganic pigment powder, and can provide different colors for the system, wherein the organic pigment powder is an organic mixture composed of hydrocarbon compounds, and the inorganic pigment powder is a pigment powder that does not contain metals or organic matters. The pigment powder may be, for example, titanium dioxide, carbon black, phthalocyanine blue, phthalocyanine green, benzidine yellow, rubine 4B, Yonggu purple, Yonggu red, and the like.

In some preferred embodiments, the usage amount of the pigment powder is 0.001 to 0.5 wt. % of the coating composition. As an example, the usage amount of the pigment powder is 0.001%, 0.003%, 0.005%, 0.007%, 0.01%, 0.02%, 0.03%, 0.04%, 0.05%, 0.06%, 0.07%, 0.08%, 0.09%, 0.1%, 0.15%, 0.2%, 0.25%, 0.3%, 0.35%, 0.4%, 0.45%, 0.5% and the like of the weight of the coating composition, further preferably, the usage amount of the pigment powder is 0.005-0.2 wt. % of the coating composition.

From the perspective of multi-core optical fiber identification, in some preferred embodiments, the coating composition also comprises fluorescent whitening powder.

In some preferred embodiments, the fluorescent whitening powder is selected from a mixture of one or more of stilbene-type fluorescent whitening agents, coumarin-type fluorescent whitening agents, azole-type fluorescent whitening agents, and dicarboximide-type fluorescent whitening agents. The stilbene-type fluorescent whitening agents may be, for example, triazine-stilbene-type stilbene, bisamide-type stilbene, triazole-type stilbene, and the like; the coumarin-type fluorescent whitening agents may be, for example, 3-carboxy coumarin, 4-methyl-7-amino coumarin, 3-phenyl-7-amino coumarin, heterocyclic coumarin, and the like; the azole-type fluorescent whitening agents may be, for example, benzoxazole, benzimidazole, pyrazoline, other heterocyclic azole-type fluorescent whitening agents, and the like; and the dicarboximide-type fluorescent whitening agents may be, for example, phthalimide, naphthalimide, and the like.

In some preferred embodiments, the usage amount of the fluorescent whitening powder is 0.001 to 0.125 wt. % of the coating composition. As an example, the usage amount of the fluorescent whitening powder is 0.001%, 0.003%, 0.005%, 0.007%, 0.01%, 0.012%, 0.015%, 0.018%, 0.02%, 0.025%, 0.03%, 0.035%, 0.04%, 0.045%, 0.05%, 0.055%, 0.06%, 0.065%, 0.07%, 0.075%, 0.08%, 0.085%, 0.09%, 0.095%, 0.1%, 0.11%, 0.125%, and the like of the weight of the coating composition; further preferably, the usage amount of the fluorescent whitening powder is 0.0005-0.05 wt. % of the coating composition.

The inventor found that after adding fluorescent whitening agents into the coating, the water-blocking coating has fluorescent effect under the ultraviolet light irradiation, which is easy to distinguish the multi-core optical fibers.

The present application also provides a preparation method of the above coating composition, whish is as follows: first, preparing component 1 by dissolving the weighed photoinitiator and carbonyl-containing compound in acrylic acid, adding a small amount of deionized water and diluting; dissolving sodium hydroxide in the remaining deionized water simultaneously to prepare component 2; then neutralizing component 1 and component 2 in a cold water bath (not higher than 35° C.) to prepare acrylic acid-sodium acrylate solution with a certain neutralization degree; adding a certain amount of thickener into the above acrylic acid-sodium acrylate solution and fully mixing to form a coating.

The second aspect of the present application provides an use of the ultraviolet curing coating composition as described above as a water blocking coating for dry optical cables.

The present application also provides a method of using the coating composition as described above, comprising the following steps: using an optical fiber ink coloring equipment to apply a liquid film of the coating composition with a thickness of 4-6 μm on the surface of the optical fiber through the dip coating method, curing the liquid film under the ultraviolet lamp irradiation to obtain a water blocking coating.

EXAMPLE

The technical solutions of the present application are described in detail below through Examples, but the protection scope of the present application is not limited to the described Examples. Unless otherwise specified, the raw materials in present application are commercially available.

The following are the raw materials used in each embodiment:
A unsaturated carboxylic acid and its salts
A1 acrylic acid
A2 sodium acrylate
B carbonyl-containing compound
B1 hexanediol diacrylate
B2 N,N-ethylenebisacrylamide
B3 N,N-methylenebisacrylamide
B4 N-hydroxyethyl acrylamide
B5 propylene glycol diacrylate
B6 diethylene glycol diacrylate
B7 diacetone acrylamide
B8 hydroxyethyl acrylate
B9 methoxy (polyethylene glycol) acrylate
C thickener
C1 BYK 425
C2 TEGO ViscoPlus 3010
C3 TEGO ViscoPlus 3060
C4 Optiflo H500
C5 Aquaflow NLS200
D photoinitiator
D1 907
D2 BDK
D3 2959
D4 184
D5 BP
D6 1173
D7 819
D8 TPO
D9 369
D10 4-methylbenzophenone
D11 ITX
D12 127

The preparation method of each Example comprises the following steps: preparing component 1 by dissolving the weighed photoinitiator D and carbonyl-containing compound B in acrylic acid A1, adding a small amount of deionized water and diluting; dissolving sodium hydroxide in the remaining deionized water simultaneously to prepare component 2; then neutralizing component 1 and component 2 in a cold water bath (not higher than 35° C.) to prepare acrylic acid A1-sodium acrylate A2 solution; adding thickener C into the above acrylic acid A1-sodium acrylate A2 solution and mixing to form a coating; wherein the usage amount of sodium hydroxide is determined according to the molar ratio of acrylic acid A1 and sodium acrylate A2.

The use method of each Example comprises the following steps: using an optical fiber ink coloring equipment to apply a liquid film of the coating composition with a thickness of 5 μm on the surface of the optical fiber through the dip coating method, wherein the coating is prepared by mixing components in the above proportions, then curing the liquid film under the UV lamp irradiation to obtain a water blocking coating for the optical fiber.

The performances of the coating obtained in each Example are measured, and the testing items comprise viscosity, water absorption magnification, water absorption rate, water retention performance and optical fiber attenuation. The testing methods are as follows:
1. Viscosity measurement: the viscosity of the coating is measured with the Broadfield rotary viscometer, and the unit is cps.
2. Water absorption magnification measurement: (1) applying a liquid film with a thickness of 5±0.5 μm on the surface of a clean glass plate and curing with UV lamp; (2) removing the cured coating film from the surface of the glass plate, placing in a drying oven for 24 hours, and then weighing and recording the weight as W1; (3) after the placing step, completely immersing the coating film in normal temperature deionized water for 2 hours; (4) after immersing step, taking out the coating film from the water, wiping off the residual water on the surface with dust-free paper, and then weighing, and recording the weight as W2; (5) calculating the water absorption magnification: (W2−W1)/W1.
3. Water absorption rate measurement: in the normal temperature environment, weighing 2 g of the cured coating film, adding 5 g deionized water, and recording the time required for the deionized water to be completely absorbed by the coating film.
4. Water retention performance measurement: after water absorption, placing the coating film in the drying oven at normal temperature for 24 hours, taking out, weighing and recording the weight as m2, recording the weight of the coating film after water absorption as m1, and calculating the water loss rate as (m1−m2)/m1.
5. Optical fiber attenuation measurement: Because 1550 nm wave band is more sensitive to the optical fiber bending loss than other wave bands, 1550 nm wave band is selected to test the optical fiber attenuation.

Connect one end of the optical fiber to the optical fiber tester, read five groups of optical fiber attenuation data at 1550 nm wave band, and take an average value. At 1550 nm wave band, the difference between the attenuation coefficient of the optical fiber coated with the water blocking coating and the attenuation coefficient of the common optical fiber without the water blocking coating is the increase in the optical fiber attenuation coefficient.

Example 1

TABLE 1

| Ingredients | D | water absorption magnification | water loss rate | viscosity | water absorption rate | optical fiber attenuation increase |
|---|---|---|---|---|---|---|
| (A1 + A2)-70 wt. % n(A1):n(A2) = 1:9 B1-0.1 wt. % C1-4.9 wt. % D-right column deionized water-remainder | D1-3.25 wt. % D2-1.75 wt. % | 9.6 times | 3.54% | 320 cps | 2.4 s | 0.010 dB/km |
| | D3-2 wt. % D4-1.25 wt. % D5-1.75 wt. % | 9.5 times | 3.58% | 350 cps | 2.5 s | 0.009 dB/km |
| | D4-1.35 wt. % D6-1.5 wt. % D7-2.15 wt. % | 10 times | 3.65% | 400 cps | 1.8 s | 0.010 dB/km |
| | D4-2.25 wt. % D8-2.75 wt. % | 9.8 times | 3.50% | 360 cps | 2.1 s | 0.010 dB/km |
| | D7-5 wt. % | 10 times | 3.65% | 400 cps | 4.8 s | 0.010 dB/km |

Note:
n(A1):n(A2) represents the molar ratio of raw material A1 and raw material A2, and the following is the same.

Example 2

TABLE 2

| Ingredients | D | water absorption magnification | water loss rate | viscosity | water absorption rate | optical fiber attenuation increase |
|---|---|---|---|---|---|---|
| (A1 + A2)-40 wt. % n(A1):n(A2) = 1:1 B2-0.9 wt. % C2-10 wt. % D-right column deionized water-remainder | D9-0.02 wt. % D1-0.04 wt. % D8-0.04 wt. % | 6.2 times | 3.05% | 620 cps | 3.5 s | 0.005 dB/km |
| | D6-0.063 wt. % D10-0.037 wt. % | 6.4 times | 3.11% | 630 cps | 3.2 s | 0.006 dB/km |
| | D4-0.055 wt. % D10-0.045 wt. % | 6.8 times | 3.15% | 650 cps | 2.9 s | 0.007 dB/km |
| | D3-0.05 wt. % D11-0.05 wt. % | 6.4 times | 3.13% | 620 cps | 3.2 s | 0.006 dB/km |
| | D8-0.1 wt. % | 6.4 times | 3.12% | 630 cps | 6.5 s | 0.006 dB/km |

Example 3

TABLE 3

| Ingredients | D | water absorption magnification | water loss rate | viscosity | water absorption rate | optical fiber attenuation increase |
|---|---|---|---|---|---|---|
| (A1 + A2)-47 wt. % n(A1):n(A2) = 9:1 B3-4 wt. % C3-3 wt. % D-right column deionized water-remainder | D6-0.58 wt. % D8-0.1 wt. % D11-0.32 wt. % | 5.4 times | 2.75% | 180 cps | 4.2 s | 0.005 dB/km |
| | D4-0.36 wt. % D2-0.64 wt. % | 5.6 times | 2.78% | 230 cps | 4.0 s | 0.005 dB/km |
| | D12-0.35 wt. % D9-0.15 wt. % D8-0.5 wt. % | 5.6 times | 2.81% | 230 cps | 3.8 s | 0.005 dB/km |
| | D1-0.6 wt. % D2-0.4 wt. % | 5.3 times | 2.72% | 170 cps | 4.5 s | 0.005 dB/km |
| | D6-1 wt. % | 5.4 times | 2.75% | 180 cps | 8 s | 0.005 dB/km |

Example 4

TABLE 4

| Ingredients | n(A1):n(A2) | water absorption magnification | water loss rate | viscosity | water absorption rate | optical fiber attenuation increase |
|---|---|---|---|---|---|---|
| (A1 + A2)-70 wt. % | 9:1 | 6.3 times | 3.12% | 320 cps | 3.2 s | 0.006 dB/km |
| B4-0.1 wt. % | 1:1 | 8.3 times | 3.35% | 350 cps | 2.3 s | 0.008 dB/km |
| C1-4.9 wt. % | 1:9 | 10 times | 3.65% | 400 cps | 1.8 s | 0.010 dB/km |
| D3-2 wt. % | | | | | | |
| D4-1.25 wt. % | | | | | | |
| D5-1.75 wt. % | | | | | | |
| deionized water-remainder | | | | | | |

Example 5

TABLE 5

| Ingredients | n(A1):n(A2) | water absorption magnification | water loss rate | viscosity | water absorption rate | optical fiber attenuation increase |
|---|---|---|---|---|---|---|
| (A1 + A2)-40 wt. % | 9:1 | 5.2 times | 2.69% | 620 cps | 4.5 s | 0.005 dB/km |
| B5-0.9 wt. % | 1:1 | 6.4 times | 3.15% | 630 cps | 3.7 s | 0.006 dB/km |
| C2-10 wt. % | 1:9 | 8.3 times | 3.32% | 650 cps | 2.9 s | 0.009 dB/km |
| D9-0.02 wt. % | | | | | | |
| D1-0.04 wt. % | | | | | | |
| D8-0.04 wt. % | | | | | | |
| deionized water-remainder | | | | | | |

Example 6

TABLE 6

| Ingredients | n(A1):n(A2) | water absorption magnification | water loss rate | viscosity | water absorption rate | optical fiber attenuation increase |
|---|---|---|---|---|---|---|
| (A1 + A2)-20 wt. % | 9:1 | 3 times | 2.15% | 280 cps | 15 s | 0.002 dB/km |
| B3-5 wt. % | 1:1 | 4.6 times | 2.35% | 310 cps | 10 s | 0.004 dB/km |
| C1-4 wt. % | 1:9 | 5.2 times | 2.62% | 330 cps | 8.5 s | 0.005 dB/km |
| D4-1 wt. % | | | | | | |
| deionized water-remainder | | | | | | |

Example 7

TABLE 7

| Ingredients | n(A1):n(A2) | water absorption magnification | water loss rate | viscosity | water absorption rate | optical fiber attenuation increase |
|---|---|---|---|---|---|---|
| (A1 + A2)-36.99 wt. % | 9:1 | 5 times | 2.58% | 920 cps | 9 s | 0.005 dB/km |
| B2-3 wt. % | 1:1 | 6.1 times | 2.68% | 950 cps | 6.8 s | 0.006 dB/km |
| C1-20 wt. % | 1:9 | 7.9 times | 2.75% | 1000 cps | 6.2 s | 0.007 dB/km |
| D3-0.01 wt. % | | | | | | |
| deionized water-remainder | | | | | | |

Example 8

TABLE 8

| Ingredients | n(A1):n(A2) | water absorption magnification | water loss rate | viscosity | water absorption rate | optical fiber attenuation increase |
|---|---|---|---|---|---|---|
| (A1 + A2)-66.98 wt. % | 9:1 | 5.8 times | 2.63% | 60 cps | 7.5 s | 0.006 dB/km |
| B6-0.02 wt. % | 1:1 | 8.1 times | 2.81% | 80 cps | 5.8 s | 0.008 dB/km |
| C4-1 wt. % | 1:9 | 9.4 times | 3.55% | 110 cps | 5 s | 0.010 dB/km |
| D5-2 wt. % | | | | | | |
| deionized water-remainder | | | | | | |

Example 9

TABLE 9

| Ingredients | n(A1):n(A2) | water absorption magnification | water loss rate | viscosity | water absorption rate | optical fiber attenuation increase |
|---|---|---|---|---|---|---|
| (A1 + A2)-47 wt. % | 9:1 | 5.4 times | 2.58% | 180 cps | 4.1 s | 0.006 dB/km |
| B3-4 wt. % | 1:1 | 6.5 times | 2.74% | 230 cps | 3.5 s | 0.007 dB/km |
| C5-3 wt. % | 1:9 | 8.5 times | 2.85% | 260 cps | 2.7 s | 0.009 dB/km |
| D12-0.35 wt. % | | | | | | |
| D9-0.15 wt. % | | | | | | |
| D8-0.5 wt. % | | | | | | |
| deionized water-remainder | | | | | | |

As can be seen from Tables 1-3, in Examples 1-3 of the present application, when other components remain unchanged, a group consisting of at least two types of photoinitiators is used as the photoinitiators for the present application and the proportion of alkyl phenone-type photoinitiator in the photoinitiator is less than 70 wt. %, the coating in the present application has a faster water absorption rate under the same water absorption magnification.

As can be seen from Tables 1-9, the UV coating provided by Examples 1-9 has a faster water absorption rate, especially when the photoinitiator is introduced into the coating composition in the form of a group consisting of at least two types of photoinitiators, the water absorption rate of the coating is faster and water may also be rapidly absorbed under an extreme condition with a lower water content, and the water loss rate is less than 5%, and the water retention performance is better, which may protect optical fiber from water vapor and achieve an excellent water blocking effect of the optical fiber;

The water absorption magnification of UV coating provided in the Examples of the present application is 3-10 times, which meets the water blocking requirement of the optical fiber and makes the increase in the optical fiber attenuation less than 0.01 dB/km simultaneously, has a large tolerance to the attenuation of common optical fiber and can be used for common optical fiber with a wide range of optical fiber attenuation;

The UV coating provided in the Examples of the present application absorbs water and expands to maintain an elastic film state which has a good adhesion to the optical fiber and is not easy to fall off.

Example 10

TABLE 10

| Ingredients | D | water absorption magnification | water absorption rate |
|---|---|---|---|
| (A1 + A2)-47 wt. % | D4 + D2 = 0.01 wt. % | 3.2 times | 5.2 s |
| n(A1):n(A2) = 1:1 | m(D4):m(D2) = 2:1 | | |
| B3-4 wt. % | D4 + D2 = 1 wt. % | 6.5 times | 3.5 s |
| C1-3 wt. % | m(D4):m(D2) = 2:1 | | |
| D-right column | D4 + D2 = 3 wt. % | 5.4 times | 4.5 s |
| deionized water-remainder | m(D4):m(D2) = 2:1 | | |
| | D4 + D2 = 5 wt. % | 4.2 times | 5.5 s |
| | m(D4):m(D2) = 2:1 | | |
| | D4 + D2 = 8 wt. % | 2.1 times | 15 s |
| | m(D4):m(D2) = 2:1 | | |
| | D4 + D2 = 10 wt. % | 1.2 times | 35 s |
| | m(D4):m(D2) = 2:1 | | |

Note:
m(D4):m(D2) represents the mass ratio of raw material D4 and raw material D2.

In Example 10, a mixture of D4:D2=2:1 is used as the photoinitiator in the present application, demonstrating that when the photoinitiator content is within the content range (0.01-5 wt. %) limited in the present application, the water blocking effect is better, and when within a further preferred content range (0.1-1 wt. %), the water blocking effect is even better, and when the photoinitiator content exceeds 5 wt. %, the water absorption magnification of the coating composition is difficult to meet the water blocking requirement of the optical fiber, and the water absorption rate is too slow, and the water blocking effect is not ideal in the more strict environment such as in a lower water content.

Example 11

TABLE 11

| Ingredients | C1 | water absorption magnification | viscosity | water absorption rate | optical fiber attenuation increase |
|---|---|---|---|---|---|
| (A1 + A2)-40 wt. % | 1 wt. % | 6.0 times | 120 cps | 7.2 s | 0.005 dB/km |
| n(A1):n(A2) = 1:1 | | | | | |
| B3-0.9 wt. % | | | | | |
| C1-right column | 5 wt. % | 5.9 times | 250 cps | 7 s | 0.004 dB/km |
| D9-0.1 wt. % | 10 wt. % | 6.4 times | 630 cps | 6.8 s | 0.006 dB/km |
| deionized water- | 20 wt. % | 6.3 times | 920 cps | 6.8 s | 0.005 dB/km |
| remainder | 30 wt. % | 6.5 times | 1500 cps | 6.5 s | 0.063 dB/km |

The usage amount of thickener greatly affects the viscosity of the coating composition. Example 11 shows that the viscosity of the system may be adjusted to improve the construction performance by controlling the thickener content within the content range (1%-20%) limited in the present application, further preferably within the content range (3%-10%), so that curing may occur at room temperature without heating. In addition, the applicant achieved the purpose of convenient construction by controlling the viscosity, and the study found that when the viscosity of the coating composition is too high, in order to reduce the viscosity for easy coating, the coating composition needs to be heated, which will lead to volatilization of water and precipitation of sodium acrylate in the coating composition into particles due to oversaturation. The coating on the surface of the fiber will be uneven, which will increase the optical fiber attenuation, and make the product unusable.

Example 12

During the experiment, the applicant tried to use diacetone acrylamide, N-p-hydroxyphenyl acrylamide, N,N-dibenzyl acrylamide and the like as the cross-linking agent of the present application to improve the water blocking performance of the coating composition. The results show that there was a problem of poor compatibility. Taking B7: diacetone acrylamide as an example, the experimental results are shown in Table 12.

TABLE 12

| Ingredients | n(A1):n(A2) | water absorption magnification | viscosity | water absorption rate | optical fiber attenuation increase |
|---|---|---|---|---|---|
| (A1 + A2)-66.98 wt. % | 9.5:0.5 | 1.3 times | 200 cps | 20 s | 0.001 dB/km |
| B7-0.02 wt. % | 9:1 | / | / | / | 0.085 dB/km |
| C1-1 wt. % | | | | | |
| D12-2 wt. % | | | | | |
| deionized water- | | | | | |
| remainder | | | | | |

In this Example, the applicant observed that the incompatibility of the cross-linking agent would result in the presence of particles in the water blocking coating, and that applying the coating on the surface of the optical fiber would result in the uneven surface of the optical fiber, thereby resulting in increased attenuation, and making the product unusable. Due to the limited solubility of the above types of cross-linking agents, they are not compatible with the mixture of other components and contents. If the above cross-linking agents are forced to dissolve in the mixture of other components, it is necessary to add a large amount of acid, but the added acid will be neutralized with sodium hydroxide, and the neutralization degree of acrylic acid-sodium acrylate will be less than 10%, the water absorption magnification will be reduced, and the water blocking effect is not good. The applicant's study found that neutralization degree needs to be reduced to 5% to dissolve 0.02 wt. % of the types of cross-linking agents described above. That is to say, if the neutralization degree of the acrylic acid-sodium acrylate of the present application reaches 10%, the above types of cross-linking agent are insoluble.

Example 13

TABLE 13

| Ingredients | B8/B9 | water absorption magnification/ times | water absorption rate/second | optical fiber attenuation increase |
|---|---|---|---|---|
| (A1 + A2)-70 wt. % | None | 10 | 1.8 | 0.010 dB/km |
| n(A1):n(A2) = 1:9 | B8-1 wt. % | 5.2 | 2.5 | 0.006 dB/km |
| B3-0.1 wt. % | B9-1 wt. % | 5.0 | 2.8 | 0.005 dB/km |
| B8/B9-right column | B8-3 wt. % | 2.7 | 5.6 | 0.002 dB/km |
| C1-4.9 wt. % | B9-3 wt. % | 2.4 | 6.2 | 0.002 dB/km |
| D3-3.25 wt. % | B8-5 wt. % | 0.50 | 35 | 0.001 dB/km |
| D5-1.75 wt. % | B9-5 wt. % | 0.47 | 34 | 0.001 dB/km |
| the remainder is | B8-8 wt. % | 0.11 | 60 | 0 |
| deionized water | B9-8 wt. % | 0.09 | 60 | 0 |

Example 14

TABLE 14

| Ingredients | B8/B9 | water absorption magnification/ times | water absorption rate/second | optical fiber attenuation increase |
|---|---|---|---|---|
| (A1 + A2)-47 wt. % | 无 | 6.5 | 7.2 | 0.007 dB/km |
| n(A1):n(A2) = 1:1 | B8-1 wt. % | 3.2 | 14.5 | 0.003 dB/km |
| B3-4 wt. % | B9-1 wt. % | 3.0 | 15 | 0.002 dB/km |
| B8/B9-right column | B8-3 wt. % | 1.2 | 20 | 0.001 dB/km |
| C1-3 wt. % | B9-3 wt. % | 1.0 | 22 | 0.001 dB/km |
| D2-1 wt. % | B8-5 wt. % | 0.13 | 52 | 0 |
| the remainder is | B9-5 wt. % | 0.09 | 58 | 0 |
| deionized water | B8-8 wt. % | 0.05 | 60 | 0 |
| | B9-8 wt. % | 0.03 | 60 | 0 |

Tables 13 and 14 show that the above-mentioned types of carbonyl-containing compounds (such as hydroxyethyl acrylate) have little effect on the water absorption magnification, but the increase of their contents will reduce the water absorption magnification and water absorption rate of the coating composition. Specifically, when the additive amount exceeds 1%, the coating composition is difficult to meet the basic water blocking requirements for the optical fiber, and when the additive amount exceeds 5%, the water blocking coating has basically lost the ability to absorb water. Examples 12 and 13 show that the influence of the co-monomer is consistent for formulations of different water absorption levels.

Example 15

TABLE 15

Influences of water absorption magnification on the attenuation of optical fiber after the formation of cable

| Ingredients | water absorption magnification | optical cable attenuation coefficient increase |
|---|---|---|
| (A1 + A2)-47 wt. % n(A1):n(A2) = 1:1 B3-4 wt. % B9-3 wt. % C1-3 wt. % D2-1 wt. % the remainder is deionized water | 1 time | 0.001 dB/km |
| (A1 + A2)-47 wt. % n(A1):n(A2) = 1:1 B3-4 wt. % B9-1 wt. % C1-3 wt. % D2-1 wt. % the remainder is deionized water | 3 times | 0.002 dB/km |
| (A1 + A2)-47 wt. % n(A1):n(A2) = 1:1 B3-4 wt. % B9-0.3 wt. % C1-3 wt. % D2-1 wt. % the remainder is deionized water | 5 times | 0.006 dB/km |
| (A1 + A2)-70 wt. % n(A1):n(A2) = 1:9 B3-0.1 wt. % C1-4.9 wt. % D3-3.25 wt. % D5-1.75 wt. % the remainder is deionized water | 10 times | 0.010 dB/km |
| (A1 + A2)-80 wt. % n(A1):n(A2) = 1:9 B3-0.1 wt. % C1-4.9 wt. % D3-3.25 wt. % the remainder is deionized water | 15 times | 0.020 dB/km |
| (A1 + A2)-90 wt. % n(A1):n(A2) = 1:9 B3-0.1 wt. % C1-4.9 wt. % D3-3.25 wt. % the remainder is deionized water | 20 times | 0.051 dB/km |

The attenuation coefficient of Common optical fiber (without water blocking coating) is generally 0.180 dB/km-0.190 dB/km, and usually the attenuation coefficient of the optical fiber shall not exceed 0.200 dB/km. Based on the attenuation coefficient of common optical fiber, the increase in the attenuation coefficient of the optical fiber caused by the increase of the external force (such as the applying of water-blocking coating) must be less than 0.02 dB/km, preferably less than 0.01 dB/km, such that it will be accepted by the market. The increase of the attenuation coefficient of the optical fiber in Table 15 is the increase of attenuation coefficient of the optical fiber coated with water blocking coating in view of the common optical fiber without water blocking coating. According to the data in the table above, when the water blocking coating is applied to the optical fiber, and the water absorption magnification is 1-15 times, the increase in the attenuation coefficient of the optical fiber is less than or equal to 0.02 dB/km, and when the water absorption magnification exceeds 15 times, the attenuation coefficient of the optical fiber increase obviously and such products will not be accepted by the market. In order to ensure that the optical fiber has a certain water blocking effect while avoiding high attenuation, the water absorption magnification of water blocking coating should be controlled at 3-15 times, preferably at 3-10 times. In addition, from the perspective of controlling the attenuation of optical fiber, the water blocking coating of optical fiber provided in the present application has a high tolerance for common optical fiber, and can be used for common optical fiber with a wide range of attenuation for optical fiber.

The foregoing examples are illustrative only and are intended to explain some of the features of the methods described in the present application. The attached claims are intended to claim a broadest possible scope as conceivable, and the Examples presented herein are only descriptions of the chosen embodiments according to a combination of all possible Examples. Therefore, the applicant's intention is that the attached claims are not limited by the selection of examples that illustrate the characteristics of the present application. Some of the numerical ranges used in the claims also include subranges within them, and variations in these ranges should also be interpreted to be covered, where possible, by the attached claims.

INDUSTRIAL APPLICABILITY

The ultraviolet curing coating compositions involved in the present application may be applied in the technical field of ultraviolet curing coating.

The invention claimed is:

1. An ultraviolet curing coating composition, wherein the composition comprises the following components: unsaturated carboxylic acid and unsaturated carboxylate, carbonyl-containing compound, thickener, photoinitiator, and deionized water;
   wherein an increase in fiber attenuation coefficient of the composition is less than 0.02 dB/km as calculated by a difference in fiber attenuation coefficients of an optical fiber having the coating composition without the coating composition;
   wherein a water absorption magnification of the composition is from 3 to 15;
   wherein the photoinitiator comprises an alkyl phenone photoinitiator and a second photoinitiator selected from the group consisting of acylphosphine oxide photoinitiator, benzophenone photoinitiator, benzil photoinitiator and thioxanthone photoinitiator; and
   wherein the alkyl phenone photoinitiator comprises from 30 wt. % to 70 wt. % of the photoinitiator.

2. The ultraviolet curing coating composition of claim 1, wherein the unsaturated carboxylates are selected from at least one of unsaturated sodium carboxylate, unsaturated potassium carboxylate and unsaturated zinc carboxylate.

3. The ultraviolet curing coating composition of claim 1, wherein the carbon atom in carbonyl bonding to an oxygen atom or a nitrogen atom.

4. The ultraviolet curing coating composition of claim 1, wherein the thickener is selected from at least one of waterborne polyurethane thickener, hydrophobic modified polyether thickener and hydrophobic modified amino thickener.

5. A method for producing a dry cable, comprising:
utilizing the ultraviolet curing coating composition of claim 1, and
curing the composition in the dry cable.

6. An ultraviolet curing coating composition, wherein the composition comprises the following components: unsaturated carboxylic acid and unsaturated carboxylate, carbonyl-containing compound, thickener, photoinitiator, and deionized water;
wherein an increase in fiber attenuation coefficient of the composition is less than 0.02 dB/km as calculated by a difference in fiber attenuation coefficients of an optical fiber having the coating composition without the coating composition;
wherein a water absorption magnification of the composition is from 3 to 15;
wherein the photoinitiator comprises an alkyl phenone photoinitiator and at least two additional photoinitiators is selected from the group consisting of acylphosphine oxide photoinitiator, benzophenone photoinitiator, benzil photoinitiator and thioxanthone photoinitiator; and
wherein the alkyl phenone photoinitiator comprises from 30 wt. % to 70 wt. % of the photoinitiator.

7. The ultraviolet curing coating composition of claim 6, wherein the unsaturated carboxylates are selected from at least one of unsaturated sodium carboxylate, unsaturated potassium carboxylate and unsaturated zinc carboxylate.

8. The ultraviolet curing coating composition of claim 6, wherein the carbon atom in carbonyl bonding to an oxygen atom or a nitrogen atom.

9. The ultraviolet curing coating composition of claim 6, wherein the thickener is selected from at least one of waterborne polyurethane thickener, hydrophobic modified polyether thickener and hydrophobic modified amino thickener.

10. A method for producing a dry cable, comprising:
utilizing the ultraviolet curing coating composition of claim 6, and
curing the composition in the dry cable.

* * * * *